(12) United States Patent
Yang et al.

(10) Patent No.: US 12,279,266 B2
(45) Date of Patent: Apr. 15, 2025

(54) INFORMATION TRANSMISSION METHOD, BASE STATION AND TERMINAL

(71) Applicant: DATANG MOBILE COMMUNICATIONS EQUIPMENT CO., LTD., Beijing (CN)

(72) Inventors: Meiying Yang, Beijing (CN); Lei Wang, Beijing (CN); Jiaqing Wang, Beijing (CN); Chen Luo, Beijing (CN)

(73) Assignee: Datang Mobile Communications Equipment Co., Ltd., Beijing (CN)

( * ) Notice: Subject to any disclaimer, the term of this patent is extended or adjusted under 35 U.S.C. 154(b) by 521 days.

(21) Appl. No.: 17/293,892

(22) PCT Filed: Dec. 4, 2019

(86) PCT No.: PCT/CN2019/122914
§ 371 (c)(1),
(2) Date: May 13, 2021

(87) PCT Pub. No.: WO2020/125411
PCT Pub. Date: Jun. 25, 2020

(65) Prior Publication Data
US 2022/0015127 A1    Jan. 13, 2022

(30) Foreign Application Priority Data
Dec. 20, 2018 (CN) .......................... 201811565584.1

(51) Int. Cl.
*H04W 72/23* (2023.01)
(52) U.S. Cl.
CPC .................................. *H04W 72/23* (2023.01)

(58) Field of Classification Search
CPC ............. H04W 72/23; H04W 52/0225; H04W 52/0216; H04L 5/0082; H04L 5/0094; H04L 27/2602; H04L 5/0053; Y02D 30/70
See application file for complete search history.

(56) References Cited

U.S. PATENT DOCUMENTS

2018/0234955 A1    8/2018  Lin
2019/0082453 A1    3/2019  Lyu et al.
(Continued)

FOREIGN PATENT DOCUMENTS

| CN | 102710405 A | 10/2012 |
|---|---|---|
| CN | 107370562 A | 11/2017 |
| WO | 2018082420 A1 | 5/2018 |

OTHER PUBLICATIONS

International Search Report from PCT/CN2019/122914, dated Mar. 5, 2020, with English translation from WIPO, all pages.
(Continued)

*Primary Examiner* — Yaotang Wang
(74) *Attorney, Agent, or Firm* — Harness, Dickey & Pierce, P.L.C.

(57) ABSTRACT

An information transmission method, a base station and a terminal are provided. The information transmission method of the embodiments of the present disclosure includes: configuring monitoring information for at least one scheduling window, wherein the monitoring information is configured to indicate that PDCCH monitoring is to be performed in a first target time unit of the scheduling window and/or that the PDCCH monitoring is to be skipped in a second target time unit of the scheduling window; notifying a terminal of the monitoring information.

17 Claims, 4 Drawing Sheets

(56) References Cited

U.S. PATENT DOCUMENTS

| | | | |
|---|---|---|---|
| 2019/0260558 A1 | 8/2019 | Wang et al. | |
| 2019/0306737 A1* | 10/2019 | Kwak | H04W 24/08 |
| 2019/0313383 A1* | 10/2019 | Xiong | H04W 16/14 |
| 2021/0250922 A1* | 8/2021 | Xu | H04L 5/0082 |
| 2021/0360528 A1* | 11/2021 | Cai | H04L 5/001 |

OTHER PUBLICATIONS

Written Opinion of the International Searching Authority from PCT/CN2019/122914, dated Mar. 5, 2020, with English translation from WIPO, all pages.

International Preliminary Report on Patentability from PCT/CN2019/122914, dated Jun. 16, 2021, with English translation from WIPO, all pages.

Qualcomm Incorporated, "Considerations on SI schedule", R2-1812743, 3GPP TSG-RAN WG2 Meeting #103, Gothenburg, Sweden, Aug. 20-24, 2018, all pages.

Extended European Search Report from EP app. No. 19899291.9, dated Jan. 3, 2022, all pages.

Office Action for corresponding EPO patent Application No. 19899291.9, issued on Feb. 10, 2023.

"UE adaption to the traffic for UE power saving," 3GPP TSG RAN WG1 Meeting #94bis, R1-1810976, Chengdu, China, Oct. 8-12, 2018, Source: OPPO, Agenda Item: 7.2.9.2.1, all pages.

* cited by examiner

INFORMATION TRANSMISSION METHOD, BASE STATION AND TERMINAL

CROSS-REFERENCE TO RELATED APPLICATIONS

The present application is the U.S. national phase of PCT Application No. PCT/CN2019/122914 filed on Dec. 4, 2019, which claims a priority to Chinese Patent Application No. 201811565584.1 filed in China on Dec. 20, 2018, the contents of which are incorporated herein by reference in their entireties.

TECHNICAL FIELD

The present disclosure relates to the technical field of communication applications, and in particular to an information transmission method, a base station and a terminal.

BACKGROUND

In related art, with respect to scheduling, a New Radio (NR) system supports single slot scheduling and slot-aggregation scheduling. In the single slot scheduling, through a configuration of high-level signaling, a base station transmits a Physical Downlink Control Channel (PDCCH) at a position of a Monitoring Occasion (MO) of a configured PDCCH, and a terminal monitors the PDCCH at the position of the MO. Downlink Control Information (DCI) of the PDCCH being monitored, taking scheduling of a Physical Downlink Shared Channel (PDSCH) as an example, only schedules data/signaling of one slot.

In addition, the supporting of multi-slot scheduling is considered in a standard, and specific implementation of the multi-slot scheduling has not been discussed: if a quantity of slots that can be scheduled by the base station is related to a scheduling algorithm of the base station, a slot configuration, and a quantity of Downlink (DL) or Uplink (UL) slots that can be scheduled across slots in the related art, the terminal needs to support dynamic multi-slot scheduling at this time. The MO of the PDCCH is configured by semi-static high-level signaling. Since the multi-slot scheduling of the base station is dynamic at this time, a position of a semi-statically configured MO does not match an actual monitoring position of a MO of a PDCCH of the multi-slot scheduling of the base station, which may cause DCI to be not detected or to be detected excessively, resulting in loss of scheduling information or large terminal power consumption.

SUMMARY

A purpose of the present disclosure is to provide an information transmission method, a base station, and a terminal to solve a problem that a User Equipment (UE) may miss detecting a PDCCH or detect the PDCCH excessively during multi-slot scheduling, resulting in loss of scheduling information and large terminal power consumption.

In order to achieve the above purpose, the present disclosure provides an information transmission method operable by a base station, including: configuring monitoring information for at least one scheduling window, wherein the monitoring information is configured to indicate that PDCCH monitoring is to be performed in a first target time unit of the scheduling window and/or that the PDCCH monitoring is to be skipped in a second target time unit of the scheduling window; notifying a terminal of the monitoring information, wherein each of the at least one scheduling window includes at least one time unit that is used for data transmission and scheduled by the base station, and there is one scheduling window that is in the at least one scheduling window and includes at least two time units.

The monitoring information includes target information of the first target time unit and/or the second target time unit in the scheduling window; and the target information includes position information and/or quantity information, wherein the position information refers to a time position and/or a sequence position.

Notifying the terminal of the monitoring information includes: notifying the terminal of the monitoring information through predetermined information or a predetermined protocol, wherein the predetermined information includes at least one of terminal-specific DCI, group-common DCI, a Medium Access Control (MAC) control unit, and a power saving signal.

Notifying the terminal of the monitoring information through the predetermined information includes: notifying the terminal of the monitoring information through a bitmap of the predetermined information, wherein each bit in the bitmap of the predetermined information is configured to indicate that a time unit corresponding to the bit is the first target time unit or the second target time unit.

The first target time unit includes a first time unit in a first scheduling window and/or a second time unit in a second scheduling window; and the second target time unit includes a third time unit in the first scheduling window and/or a fourth time unit in the second scheduling window, wherein the first scheduling window is a scheduling window where the monitoring information is located, and the second scheduling window is a scheduling window located after the first scheduling window.

After configuring the monitoring information for the at least one scheduling window, the information transmission method further includes: notifying the terminal of status information corresponding to the monitoring information, wherein the status information includes activation or deactivation.

Notifying the terminal of the status information corresponding to the monitoring information includes: notifying the terminal of the status information corresponding to the monitoring information through terminal-specific DCI, group-common DCI, or a power saving signal.

After configuring the monitoring information for the at least one scheduling window, the information transmission method further includes: transmitting, when the monitoring information indicates that the PDCCH monitoring is to be performed in the first target time unit of the scheduling window, a PDCCH for data scheduling in the first target time unit of the scheduling window.

After transmitting the PDCCH for the data scheduling, the information transmission method further includes: transmitting a PDSCH or receiving a Physical Uplink Shared Channel (PUSCH) according to scheduling information in the PDCCH for the data scheduling.

In order to achieve the above purpose, the embodiments of the present disclosure further provide an information transmission method operable by a terminal, including: acquiring monitoring information for at least one scheduling window, wherein the monitoring information is configured to indicate that PDCCH monitoring is to be performed in a first target time unit of the scheduling window and/or that the PDCCH monitoring is to be skipped in a second target time unit of the scheduling window; performing, according to the monitoring information, a corresponding processing on a time unit in the at least one scheduling window, wherein each of the at least one scheduling window includes at least one time unit that is used for data transmission and scheduled by the base station, and there is one scheduling window that is in the at least one scheduling window and includes at least two time units.

Performing according to the monitoring information the corresponding processing on the time unit in the at least one scheduling window includes: performing PDCCH monitoring on the first target time unit of the scheduling window and acquiring a PDCCH for data scheduling, when the monitoring information indicates that the PDCCH monitoring is to be performed in the first target time unit of the scheduling window.

Performing the PDCCH monitoring on the first target time unit of the scheduling window and acquiring the PDCCH for the data scheduling when the monitoring information indicates that the PDCCH monitoring is to be performed in the first target time unit of the scheduling window includes: acquiring status information of the monitoring information, wherein the status information includes: activation or deactivation; when the monitoring information indicates that the PDCCH monitoring is to be performed in the first target time unit of the scheduling window, and the status information of the monitoring information is active, performing the PDCCH monitoring on the first target time unit of the scheduling window, and acquiring the PDCCH for the data scheduling.

Acquiring the status information of the monitoring information includes: acquiring the status information of the monitoring information through terminal-specific DCI, group-common DCI, or a power saving signal.

After acquiring the PDCCH for the data scheduling, the information transmission method further includes: receiving a PDSCH or transmitting a PUSCH according to scheduling information in the PDCCH for the data scheduling.

The monitoring information includes target information of the first target time unit and/or the second target time unit in the scheduling window; and the target information includes position information and/or quantity information, wherein the position information refers to a time position and/or a sequence position.

The acquiring the monitoring information of at least one scheduling window includes: acquiring the monitoring information through predetermined information or a predetermined protocol, wherein the predetermined information includes: at least one of terminal-specific DCI, group-common DCI, an MAC control unit, and a power saving signal.

The first target time unit includes a first time unit in a first scheduling window and/or a second time unit in a second scheduling window; and the second target time unit includes a third time unit in the first scheduling window and/or a fourth time unit in the second scheduling window, wherein the first scheduling window is a scheduling window where the monitoring information is located, and the second scheduling window is a scheduling window located after the first scheduling window.

In order to achieve the above purpose, the embodiments of the present disclosure further provide a base station, including: a transceiver, a memory, a processor, and a program stored on the memory and executable by the processor, wherein when the processor executes the program, following steps are implemented: configuring monitoring information for at least one scheduling window, wherein the monitoring information is configured to indicate that PDCCH monitoring is to be performed in a first target time unit of the scheduling window and/or that the PDCCH monitoring is to be skipped in a second target time unit of the scheduling window; notifying a terminal of the monitoring information, wherein each of the at least one scheduling window includes at least one time unit that is used for data transmission and scheduled by the base station, and there is one scheduling window that is in the at least one scheduling window and includes at least two time units.

The monitoring information includes target information of the first target time unit and/or the second target time unit in the scheduling window; and the target information includes position information and/or quantity information, wherein the position information refers to a time position and/or a sequence position.

When the processor executes the program, a following step is further implemented: notifying the terminal of the monitoring information through predetermined information or a predetermined protocol, wherein the predetermined information includes at least one of terminal-specific DCI, group-common DCI, an MAC control unit, and a power saving signal.

When the processor executes the program, a following step is further implemented: notifying the terminal of the monitoring information through a bitmap of the predetermined information, wherein each bit in the bitmap of the predetermined information is configured to indicate that a time unit corresponding to the bit is the first target time unit or the second target time unit.

The first target time unit includes a first time unit in a first scheduling window and/or a second time unit in a second scheduling window; and the second target time unit includes a third time unit in the first scheduling window and/or a fourth time unit in the second scheduling window, wherein the first scheduling window is a scheduling window where the monitoring information is located, and the second scheduling window is a scheduling window located after the first scheduling window.

When the processor executes the program, a following step is further implemented: notifying the terminal of status information corresponding to the monitoring information, wherein the status information includes activation or deactivation.

When the processor executes the program, a following step is further implemented: notifying the terminal of the status information corresponding to the monitoring information through terminal-specific DCI, group-common DCI, or a power saving signal.

When the processor executes the program, a following step is further implemented: transmitting, when the monitoring information indicates that the PDCCH monitoring is to be performed in the first target time unit of the scheduling window, a PDCCH for data scheduling in the first target time unit of the scheduling window through the transceiver.

When the processor executes the program, a following step is further implemented: transmitting a PDSCH or receiving a PUSCH through the transceiver according to scheduling information in the PDCCH for the data scheduling.

In order to achieve the above purpose, the embodiments of the present disclosure further provide a computer-readable storage medium having a computer program stored thereon, wherein when the computer program is executed by a processor, steps of the information transmission method operable by the base station as described above are implemented.

In order to achieve the above purpose, the embodiments of the present disclosure further provide a terminal, including: a transceiver, a memory, a processor, and a program stored on the memory and executable by the processor, wherein when the processor executes the program, following steps are implemented: acquiring monitoring information for at least one scheduling window, wherein the monitoring information is configured to indicate that PDCCH monitoring is to be performed in a first target time unit of the scheduling window and/or that the PDCCH monitoring is to be skipped in a second target time unit of the scheduling window; performing, according to the monitoring information, a corresponding processing on a time unit in the at least one scheduling window, wherein each of the at least one scheduling window includes at least one time unit that is used for data transmission and scheduled by the base station, and there is one scheduling window that is in the at least one scheduling window and includes at least two time units.

When the processor executes the program, following step are further implemented: performing PDCCH monitoring on the first target time unit of the scheduling window and acquiring a PDCCH for data scheduling, when the monitoring information indicates that the PDCCH monitoring is to be performed in the first target time unit of the scheduling window.

Performing the PDCCH monitoring on the first target time unit of the scheduling window and acquiring the PDCCH for the data scheduling when the monitoring information indicates that the PDCCH monitoring is to be performed in the first target time unit of the scheduling window includes: acquiring status information of the monitoring information, wherein the status information includes: activation or deactivation; when the monitoring information indicates that the PDCCH monitoring is to be performed in the first target time unit of the scheduling window, and the status information of the monitoring information is active, performing the PDCCH monitoring on the first target time unit of the scheduling window, and acquiring the PDCCH for the data scheduling.

When the processor executes the program, a following step is further implemented: acquiring the status information of the monitoring information through terminal-specific DCI, group-common DCI, or a power saving signal.

When the processor executes the program, a following step is further implemented: receiving a PDSCH or transmitting a PUSCH according to scheduling information in the PDCCH for the data scheduling.

The monitoring information includes target information of the first target time unit and/or the second target time unit in the scheduling window; and the target information includes position information and/or quantity information, wherein the position information refers to a time position and/or a sequence position.

When the processor executes the program, a following step is further implemented: acquiring the monitoring information through predetermined information or a predetermined protocol, wherein the predetermined information includes: at least one of terminal-specific DCI, group-common DCI, an MAC control unit, and a power saving signal.

The first target time unit includes a first time unit in a first scheduling window and/or a second time unit in a second scheduling window; and the second target time unit includes a third time unit in the first scheduling window and/or a fourth time unit in the second scheduling window, wherein the first scheduling window is a scheduling window where the monitoring information is located, and the second scheduling window is a scheduling window located after the first scheduling window.

In order to achieve the above purpose, the embodiments of the present disclosure further provide a computer-readable storage medium having a computer program stored thereon, wherein when the computer program is executed by a processor, steps of the information transmission method operable by the terminal side as described above are implemented.

In order to achieve the above purpose, the embodiments of the present disclosure further provide a base station, including: a configuration module, configured to configure monitoring information for at least one scheduling window, wherein the monitoring information is configured to indicate that PDCCH monitoring is to be performed in a first target time unit of the scheduling window and/or that the PDCCH monitoring is to be skipped in a second target time unit of the scheduling window; a first notification module, configured to notify a terminal of the monitoring information, wherein each of the at least one scheduling window includes at least one time unit that is used for data transmission and scheduled by the base station, and there is one scheduling window that is in the at least one scheduling window and includes at least two time units.

In order to achieve the above purpose, the embodiments of the present disclosure further provides a terminal, including: a first acquisition module, configured to acquire monitoring information for at least one scheduling window, wherein the monitoring information is configured to indicate that PDCCH monitoring is to be performed in a first target time unit of the scheduling window and/or that the PDCCH monitoring is to be skipped in a second target time unit of the scheduling window; a processing module, configured to perform, according to the monitoring information, a corresponding processing on a time unit in the at least one scheduling window, wherein each of the at least one scheduling window includes at least one time unit that is used for data transmission and scheduled by the base station, and there is one scheduling window that is in the at least one scheduling window and includes at least two time units.

The embodiments of the present disclosure have following beneficial effects: in the above technical solutions of the embodiments of the present disclosure, the monitoring information for at least one scheduling window is configured, wherein the monitoring information is configured to indicate that PDCCH monitoring is to be performed in a first target time unit of the scheduling window and/or that the PDCCH monitoring is to be skipped in a second target time unit of the scheduling window; the monitoring information is notified to a terminal. In a multi-time unit scheduling process of the embodiments of the present disclosure, for example, in a multi-slot scheduling process, the terminal can accurately determine a position that needs the PDCCH monitoring and a position that does not need the PDCCH monitoring according to the monitoring information, thereby effectively avoiding a problem of increased power consumption of the terminal caused by excessive detection of the PDCCH, or a problem of loss of DCI information caused by missed detection of the PDCCH.

DETAILED DESCRIPTION

Exemplary embodiments of the present disclosure will be described in more detail below with reference to the accompanying drawings. Although the exemplary embodiments of the present disclosure are shown in the accompanying drawings, it should be understood that the present disclosure may be implemented in various forms and should not be limited by the embodiments set forth herein. On the contrary, these embodiments are provided to enable a more thorough understanding of the present disclosure and can convey the scope of the present disclosure to a person skilled in the art in a complete manner.

The terms "first", "second", and the like in the specification and claims of the present application are used to distinguish similar objects, and are not necessarily used to describe a specific order or sequence. It should be understood that data used in this way can be interchanged under appropriate circumstances, so that the embodiments of the present application described herein, for example, can be implemented in a sequence other than those illustrated or described herein. In addition, the term "including" and "having" and any variants thereof are intended to cover non-exclusive inclusions, for example, processes, methods, systems, products, or devices that include a series of steps or units need not be limited to those steps or units that are explicitly listed, but may include other steps or units that are not explicitly listed or that are inherent to these processes, methods, products, or devices. In the specification and claims, "and/or" means at least one of related objects.

The following description provides examples rather than limiting the scope, applicability, or configuration set forth in the claims. Functions and arrangements of discussed elements can be changed without departing from the spirit and scope of the present disclosure. Various examples may omit, replace, or add various procedures or components as appropriate. For example, the described method can be performed in an order different from that described, and various steps can be added, omitted, or combined. In addition, elements described with reference to certain examples may be combined in other examples.

Figure 1:
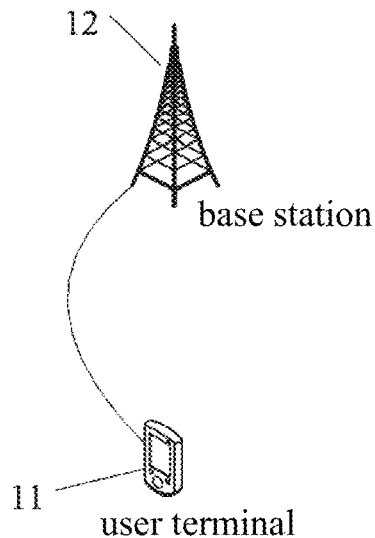
FIG. 1 is a structural diagram of a network system applicable to an embodiment of the disclosure.

Referring to FIG. 1, FIG. 1 is a structural diagram of a network system applicable to an embodiment of the present disclosure. As shown in FIG. 1, a terminal 11 and a network side device 12 are included. The terminal 11 may be a User Equipment (UE) or other terminal side devices, such as a mobile phone, a tablet personal computer, a laptop computer, a Personal Digital Assistant (PDA), a Mobile Internet Device (MID), or a wearable device, etc. It should be appreciated that a specific type of the terminal 11 is not limited in the embodiments of the present disclosure. The network side device 12 may be a base station, such as a macro station, a Long Term Evolution (LTE) evolved Node B (eNB), a fifth generation (5G) New Radio (NR) Node B (NB), etc.; the network side device may also be a micro base station, such as Low Power Node (LPN), pico base station, femto base station, etc., or the network side device may be an Access Point (AP); the base station may also be a network node composed of a Central Unit (CU) and multiple Transmission Reception Points (TRP) managed and controlled by the CU. It should be appreciated that a specific type of the network side device is not limited in the embodiments of the present disclosure.

Figure 2:
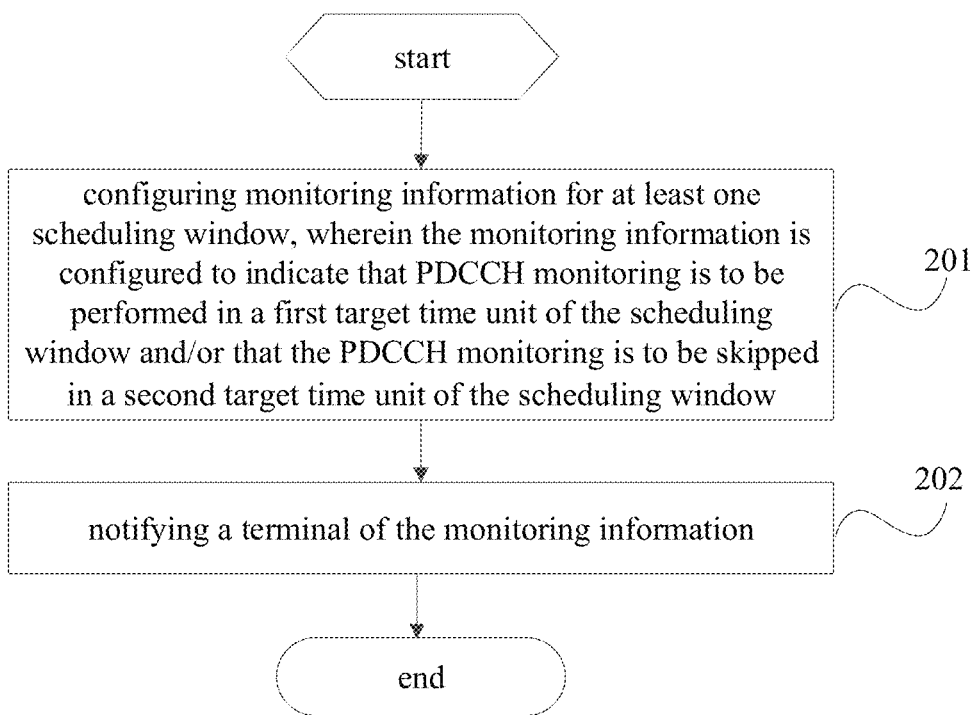
FIG. 2 is a first schematic flowchart of an information transmission method according to an embodiment of the disclosure.

As shown in FIG. 2, an embodiment of the present disclosure provides an information transmission method operable by a base station, including: Step 201 of configuring monitoring information for at least one scheduling window, wherein the monitoring information is configured to indicate that PDCCH monitoring is to be performed in a first target time unit of the scheduling window and/or that the PDCCH monitoring is to be skipped in a second target time unit of the scheduling window.

Each of the at least one scheduling window includes at least one time unit that is used for data transmission and scheduled by the base station, and there is one scheduling window that is in the at least one scheduling window and includes at least two time units.

The monitoring information includes target information of the first target time unit and/or the second target time unit in the scheduling window; and the target information includes position information and/or quantity information, wherein the position information refers to a time position and/or a sequence position.

When the target information only includes the quantity information, the position information can be pre-agreed. For example, if the monitoring information indicates that the PDCCH monitoring is to be performed in two first target time units of the scheduling window, it means that the PDCCH monitoring is to be performed in a first time unit and a last time unit of the scheduling window. For another example, if the monitoring information indicates that the PDCCH monitoring is to be performed in a first target time unit of the scheduling window, it means that the PDCCH monitoring is to be performed in the last one time unit of the scheduling window.

The time unit may be a slot, a symbol, or absolute time, and the absolute time may be second, millisecond, or microsecond.

In the embodiments of the present disclosure, the first target time unit is a time unit in which the PDCCH monitoring is to be performed, and the second target unit is a time unit in which the PDCCH monitoring is to be skipped or not performed.

Further, the quantity of first target time units in each scheduling window may be same or different, and the quantity of second target time units in each scheduling window may be same or different.

For example, the base station configures monitoring information in one scheduling window, the scheduling window includes M time units, and the monitoring information is configured to indicate that the PDCCH monitoring is to be performed in N1 time units among M time units and/or that the PDCCH monitoring is to be skipped in N2 time units among M time units.

M is an integer greater than 2, and both N1 and N2 are integers.

Step 202: notifying a terminal of the monitoring information.

In the information transmission method of an embodiment of the present disclosure, monitoring information for at least one scheduling window is configured, wherein the monitoring information is configured to indicate that PDCCH monitoring is to be performed in a first target time unit of the scheduling window and/or that the PDCCH monitoring is to be skipped in a second target time unit of the scheduling window; the monitoring information is notified to a terminal. In a multi-time unit scheduling process of the embodiments of the present disclosure, for example, in a multi-slot scheduling process, the terminal can accurately determine a position that needs the PDCCH monitoring and a position that does not need the PDCCH monitoring according to the monitoring information, thereby effectively avoiding a problem of increased power consumption of the terminal caused by excessive detection of the PDCCH, or a problem of loss of DCI information caused by missed detection of the PDCCH.

Further, notifying the terminal of the monitoring information includes: notifying the terminal of the monitoring information through predetermined information or a predetermined protocol, wherein the predetermined information includes at least one of terminal-specific Downlink Control Information (DCI), group-common DCI, an MAC control unit, and a power saving signal.

Further, notifying the terminal of the monitoring information through the predetermined information includes: notifying the terminal of the monitoring information through a bitmap of the predetermined information, wherein each bit in the bitmap of the predetermined information is configured to indicate that a time unit corresponding to the bit is the first target time unit or the second target time unit.

For example, when the bit is 0, it means that the time unit corresponding to the bit is the second target time unit, that is, the PDCCH monitoring is to be skipped in the time unit. When the bit is 1, it means that the time unit corresponding to the bit is the first time unit, that is, the PDCCH monitoring is to be performed in the first time unit.

The predetermined protocol may be a protocol that a monitoring position and/or a non-monitoring position of the PDCCH is pre-agreed, and the terminal monitors the PDCCH according to the predetermined protocol.

Further, the first target time unit includes a first time unit in a first scheduling window and/or a second time unit in a second scheduling window; and the second target time unit includes a third time unit in the first scheduling window and/or a fourth time unit in the second scheduling window, wherein the first scheduling window is a scheduling window where the monitoring information is located, and the second scheduling window is a scheduling window located after the first scheduling window.

Figure 3:
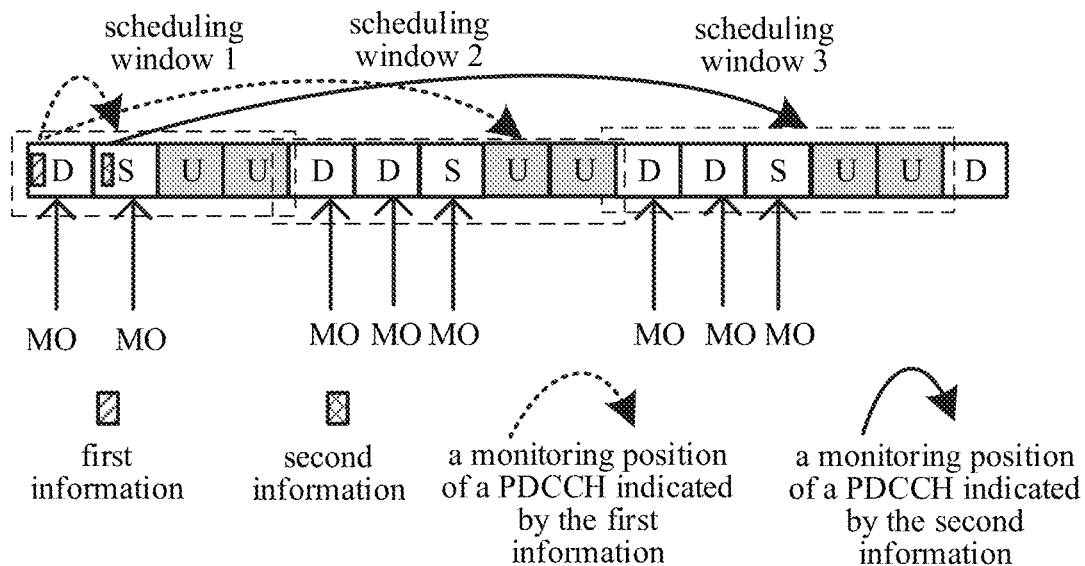
FIG. 3 is a schematic diagram of a first position of monitoring information in an embodiment of the disclosure.
Figure 4:
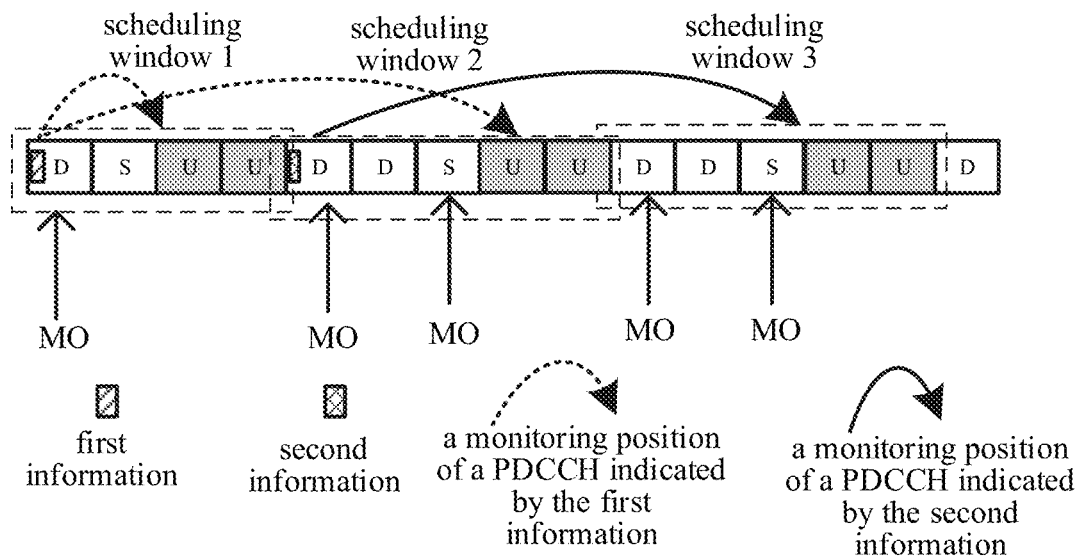
FIG. 4 is a schematic diagram of a second position of the monitoring information in an embodiment of the disclosure.

As shown in FIG. 3 and FIG. 4, the base station configures monitoring information of scheduling window 1, scheduling window 2, and scheduling window 3. The monitoring information is indicated by a predetermined message, such as DCI. The monitoring information is configured to indicate that the PDCCH monitoring is to be performed in first target time units of the scheduling window 1, the scheduling window 2, and the scheduling window 3.

The monitoring information may include a first information and a second information. As shown in FIG. 3, the first information and the second information are both located in the scheduling window 1, the first information is configured to indicate that the PDCCH monitoring is to be performed in time units of the scheduling window 1 and the scheduling window 2, and the second information is configured to indicate that the PDCCH monitoring is to be performed in a time unit of scheduling window 3, wherein the scheduling window 1 includes four time units, a first time unit and a second time unit of the scheduling window 1 include MO, and the first time unit and the second time unit of the scheduling window 1 are time units in which the PDCCH monitoring is to be performed; the scheduling window 2 includes five time units, and first three time units of the scheduling window 2 include MO, that is, the first three time units of the scheduling window 2 are time units in which the PDCCH monitoring is to be performed; and the scheduling window 3 includes five time units, and first three time units of the scheduling window 3 include MO, that is, the first three time units of the scheduling window 3 are time units in which the PDCCH monitoring is to be performed. Each subframe is a time unit, D represents a downlink subframe, S represents a special subframe, and U represents an uplink subframe.

As shown in FIG. 4, the first information is located in the scheduling window 1, and the second information is located in the scheduling window 2. The first information is configured to indicate that the PDCCH monitoring is to be performed in time units of the scheduling window 1 and the scheduling window 2, and the second information is configured to indicate that the PDCCH monitoring is to be performed in a time unit of scheduling window 3, wherein the scheduling window 1 includes four time units, a first time unit of the scheduling window 1 includes MO, and the first time unit of the scheduling window 1 is a time in which the PDCCH monitoring is to be performed, the scheduling window 2 includes five time units, and a first time unit and a third time unit of the scheduling window 2 include MO, that is, the first time unit and the third time unit of the scheduling window 2 are time units in which the PDCCH monitoring is to be performed, and the scheduling window 3 includes five time units, and a first time unit and a third time unit include MO, that is, the first time unit and the third time unit of the scheduling window 3 are time units in which the PDCCH monitoring is to be performed.

In the embodiments of the present disclosure, the monitoring information may be located in a same time unit, or may be located in different time units.

In an embodiment, after configuring the monitoring information for the at least one scheduling window, the information transmission method further includes: notifying the terminal of status information corresponding to the monitoring information, wherein the status information includes activation or deactivation.

Here, when the status information corresponding to the monitoring information is active, the terminal performs corresponding processing on a time unit in the at least one scheduling window according to the monitoring information.

For example, if the monitoring information is configured to indicate that the PDCCH monitoring is to be performed in the first target time unit of the scheduling window, when the status information corresponding to the monitoring information is configured to be active, the terminal will perform the PDCCH monitoring in the first target time unit of the scheduling window according to the monitoring information; otherwise, the PDCCH monitoring is to be skipped in the first target time unit of the scheduling window.

Notifying the terminal of the status information corresponding to the monitoring information includes: notifying the terminal of the status information corresponding to the monitoring information through terminal-specific DCI, group-common DCI, or a power saving signal.

Further, after configuring the monitoring information for the at least one scheduling window, the information transmission method further includes: transmitting, when the monitoring information indicates that the PDCCH monitoring is to be performed in the first target time unit of the scheduling window, a PDCCH for data scheduling in the first target time unit of the scheduling window.

Further, after transmitting the PDCCH for the data scheduling, the information transmission method further includes: transmitting a PDSCH or receiving a PUSCH according to scheduling information in the PDCCH for the data scheduling.

The information transmission method of a base station side in the embodiments of the present disclosure will be described below in combination with specific embodiments.

Embodiment 1: indicating the monitoring information through the terminal-specific DCI.

Step 1: configuring, by the base station, the monitoring information of the at least one scheduling window.

The monitoring information includes target information of the first target time unit and/or the second target time unit in the scheduling window; and the target information includes position information and/or quantity information, wherein the position information refers to a time position and/or a sequence position.

Position information of the first target time unit may be information of a position where the PDCCH is to be transmitted, and the PDCCH is to be monitored by the terminal at a position of the first target time unit, or the position information of the first target time unit is position information of a PDCCH MO configured by the base station, and the terminal monitors the PDCCH at a position of the PDCCH MO.

Position information of the second target time unit is information of a position where the base station does not transmit the PDCCH, or position information that does not include the PDCCH MO, and the terminal does not perform the PDCCH monitoring at a position corresponding to the position information of the second target time unit, that is, the PDCCH monitoring is skipped.

The terminal enters different power consumption modes at the first target time unit and the second target time unit, and power consumption at the first time unit is greater than power consumption at the second time unit.

Here, the quantity of time units scheduled by a scheduling window of the base station may be M, wherein the quantity of time units including the monitoring position of the PDCCH may be N, wherein M>N or M=N. Specifically, the base station may define that the PDCCH is to be monitored at a position of N=1, N=M in M time units; the base station may also define that the PDCCH is to be monitored at a position of N=1, N=M/2, and N=M in M time units, or that N=0, that is, the PDCCH is not monitored in the M time units.

A quantity of time units scheduled by the scheduling window of the base station may be M, and a quantity of time units for skipping the PDCCH monitoring may be N, wherein M>N or M=N. Specifically, the base station may define that the PDCCH monitoring is to be skipped at a position of N=1, N=M in M time units; or define that the PDCCH monitoring is to be skipped at a position of N=1, N=M/2, and N=M in M time units.

An indication of position information for skipping the PDCCH monitoring and/or performing the PDCCH monitoring may be based on an indication of the bitmap, for example, with respect to scheduling of M time units, for each time unit, 0 indicates that the PDCCH monitoring may be skipped in this time unit; and 1 indicates that the PDCCH monitoring may be performed in this time unit; the indication of the bitmap may be scrambled in a DCI format by a scrambling code, and the scrambling code may be a defined Radio Network Temporary Identifier (RNTI) sequence agreed by the base station and the UE; the RNTI may be a hexadecimal sequence from 0 to 65535; the indication may be carried by a frozen bit information; the frozen bit carries information, which may be a total quantity of scheduled time units and an indication of a bitmap of each scheduled time, the total quantity of scheduled time units, and an indication of position information for skipping the PDCCH monitoring and/or performing the PDCCH monitoring at a time position of each MO.

In addition, MO of the PDCCH may be configured by high-level signaling. A NR-PDCCH supports multiple monitoring cycle configurations, and slot level monitoring supports a first preset quantity of slots, for example, 1 slot to 2560 slots. In addition, in order to support an Ultra-Reliable Low Latency Communication (URLLC) service, monitoring of at least one Orthogonal Frequency Division Multiplexing (OFDM) symbol is supported. A unit of PDCCH monitoring cycle and a unit of an offset value are both slots, and the terminal determines a slot for monitoring the downlink control channel according to this configuration parameter. Generally, a monitoring period of the downlink control channel for data scheduling is a second preset quantity of time slots, such as {1 2 4 8 10 20 40} slot(s), and these cycle configurations can meet scheduling requirements in different scenarios.

Step 2: transmitting, by the base station, a PDCCH carrying the monitoring information and the scheduling information, wherein the PDCCH carries terminal-specific DCI, and the terminal-specific DCI carries the monitoring information.

It should be noted that if the terminal has not received the PDCCH for a long time before acquiring the PDCCH that carries the monitoring information and is transmitted by the base station, for example, when a cycle configuration of discontinuous reception (DRX) is large, the DRX enters a DRX-active status from the a DRX-deactive status. Each time the UE enters DRX-on, the UE can monitor the PDCCH according to monitoring position information of a PDCCH configured by default, or monitor the PDCCH according to monitoring position information indicated by the last PDCCH, or monitor the PDCCH according to monitoring position information of a PDCCH configured by Radio Resource Control (RRC), until a new PDCCH has been monitored, and then the PDCCH is monitored according to monitoring position information of a detected PDCCH.

In addition, in this step, the base station can transmit a PDCCH carrying the monitoring information and a PDCCH carrying the scheduling information separately, or transmit a PDCCH carrying both the monitoring information and the scheduling information.

Step 3: Transmitting the PDSCH and receiving the PUSCH by the base station according to the scheduling information.

Embodiment 2: indicating the monitoring information through the group-common DCI.

Step 1: configuring, by the base station, the monitoring information of the at least one scheduling window.

This step is same as the step 1 in the embodiment 1, and will not be repeatedly described herein.

Step 2: transmitting, by the base station, the PDCCH carrying the monitoring information, wherein the PDCCH carries the group-common DCI, and the group-common DCI carries the monitoring information.

Step 3: transmitting, by the base station, a PDCCH for scheduling according to the monitoring information.

The base station transmits the PDCCH for scheduling according to a position of a PDCCH indicated by the group-common DCI in step 2; wherein, a first monitoring position of a PDCCH carrying the group-common DCI and a second monitoring position of the PDCCH for scheduling can be same or different. Assuming that a time position of the first monitoring position is X and a time position of the second monitoring position is Y, then X<Y or X=Y, and the time position can take slot as granularity, or take symbol as granularity, or take subframe as granularity, or take absolute time millisecond, second, microsecond as granularity; the time positions of the first monitoring position and the second monitoring position may be predetermined, agreed, or configured by high-level signaling.

Step 4: transmitting the PDSCH or receiving the PUSCH by the base station according to scheduling information of the PDCCH.

Embodiment 3: indicating the monitoring information through the power saving signal.

Step 1: configuring, by the base station, the monitoring information of the at least one scheduling window.

This step is same as the step 1 in the embodiment 1, and will not be repeatedly described herein.

Step 2: transmitting, by the base station, the power saving signal for indicating the monitoring information.

The power saving signal may be based on an indication of the bitmap, for example, with respect to scheduling of M time units, for each time unit, 0 indicates that the PDCCH monitoring may be skipped in this time unit; and 1 indicates that the PDCCH monitoring may be performed in this time unit; the indication of the bitmap may be scrambling the power saving signal by a scrambling code, and the scrambling code may be a defined Radio Network Temporary Identifier (RNTI) sequence agreed by the base station and the UE; the RNTI may be a hexadecimal sequence from 0 to 65535.

Step 3: transmitting, by the base station, the PDCCH for scheduling according to the monitoring information.

Specifically, the base station transmits the PDCCH for scheduling according to a monitoring position of a PDCCH indicated by the monitoring information.

Step 4: transmitting the PDSCH or receiving the PUSCH by the base station according to the scheduling information of the PDCCH in step 3.

Embodiment 4: indicating the monitoring information through the predetermined protocol.

Step 1: configuring, by the base station, the monitoring information of the at least one scheduling window according to the predetermined protocol.

The predetermined protocol pre-agrees the monitoring position of the PDCCH and/or skips a position where the PDCCH monitoring. The predetermined protocol may be pre-agreed by the terminal and the base station, or may be configured by a high layer for the terminal, or may be reported to the base station by the terminal. The base station and the terminal use a same principle to determine the PDCCH monitoring position and/or skip the PDCCH monitoring position.

Step 2: transmitting, by the base station, the PDCCH for scheduling according to the monitoring information.

The PDCCH is configured to indicate scheduling information of the at least one time unit; and a quantity of the at least one time unit may be M, wherein M is a positive integer, and M may be different each time the base station schedules data.

Step 3: transmitting the PDSCH or receiving the PUSCH by the base station according to the PDCCH for scheduling.

Embodiment 5: indicating the monitoring information through MAC-CE (Control Element).

Step 1: configuring, by the base station, the monitoring information of the at least one scheduling window.

This step is same as the step 1 in the embodiment 1, and will not be repeatedly described herein.

Step 2: transmitting, by the base station, an MAC-CE carrying monitoring information.

The MAC-CE may be based on an indication of the bitmap, for example, with respect to scheduling of M time units, for each time unit, 0 indicates that the PDCCH monitoring may be skipped in this time unit; and 1 indicates that the PDCCH monitoring may be performed in this time unit; the indication of the bitmap may be scrambling the power saving signal by a scrambling code, and the scrambling code may be a defined Radio Network Temporary Identifier (RNTI) sequence agreed by the base station and the UE; the RNTI may be a hexadecimal sequence from 0 to 65535.

The MAC-CE may be carried on the PDSCH, and the base station may transmit the PDSCH through scheduling.

Step 3: transmitting, by the base station, the PDCCH for scheduling according to the monitoring information.

For example, when the monitoring information is configured to indicate that the PDCCH monitoring is to be performed in the first target time unit in the scheduling window, the PDCCH for scheduling is transmitted.

Step 4: transmitting the PDSCH or receiving the PUSCH by the base station according to the PDCCH for scheduling.

Embodiment 6: indicating the monitoring information by the terminal-specific DCI, and indicating the status information of the monitoring information by the group-common DCI.

Step 1: configuring, by the base station, monitoring information of at least one scheduling window and the status information of the monitoring information.

Step 2: transmitting a PDCCH carrying the monitoring information and the status information, wherein the PDCCH carries terminal-specific DCI for indicating the monitoring information and group-common DCI for indicating the status information.

The base station may transmit a PDCCH carrying the terminal-specific DCI and a PDCCH carrying the group-common DCI separately, or may transmit a PDCCH that carries both the terminal-specific DCI and the group-common DCI.

Step 3: transmitting, by the base station, the PDCCH for scheduling according to the monitoring information and the status information.

For example, when the status information is configured to be active, and the monitoring information is configured to indicate that the PDCCH monitoring is to be performed in the first target time unit in the scheduling window, the PDCCH for scheduling is transmitted.

Step 4: transmitting the PDSCH or receiving the PUSCH according to the PDCCH for scheduling.

It should be noted that, in the embodiments of the present disclosure, the status information of the monitoring information can also be indicated through the terminal-specific DCI, and the monitoring information can be indicated through the group-common DCI. A specific implementation process is same as that of the embodiment 6, and will not be repeatedly described in detail herein.

In the transmission method of an embodiment of the present disclosure, monitoring information for at least one scheduling window is configured, wherein the monitoring information is configured to indicate that PDCCH monitoring is to be performed in a first target time unit of the scheduling window and/or that the PDCCH monitoring is to be skipped in a second target time unit of the scheduling window; the monitoring information is notified to a terminal. In a multi-time unit scheduling process of the embodiments of the present disclosure, for example, in a multi-slot scheduling process, the terminal can accurately determine a position that needs the PDCCH monitoring and a position that does not need the PDCCH monitoring according to the monitoring information, thereby effectively avoiding a problem of increased power consumption of the terminal caused by excessive detection of the PDCCH, or a problem of loss of DCI information caused by missed detection of the PDCCH.

Figure 5:
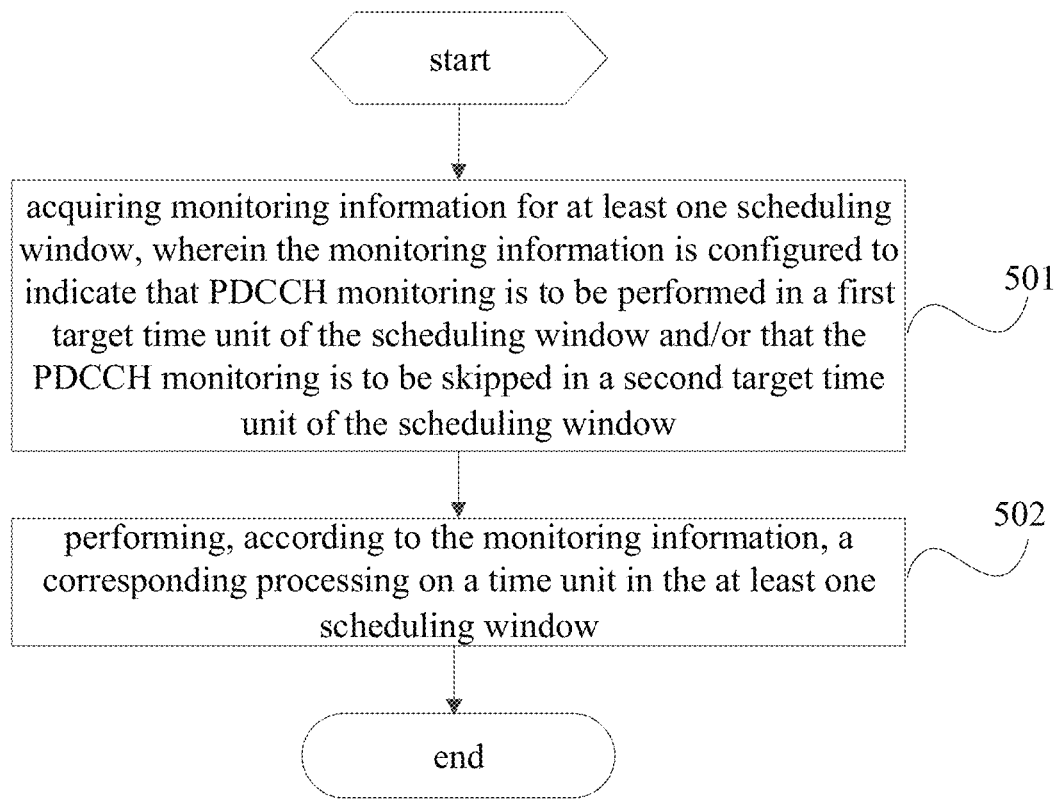
FIG. 5 is a second schematic flowchart of the information transmission method according to an embodiment of the disclosure.

As shown in FIG. 5, an embodiment of the present disclosure further provides an information transmission method operable by a terminal, including the following steps.

Step 501: acquiring monitoring information for at least one scheduling window, wherein the monitoring information is configured to indicate that PDCCH monitoring is to be performed in a first target time unit of the scheduling window and/or that the PDCCH monitoring is to be skipped in a second target time unit of the scheduling window.

Each of the at least one scheduling window includes at least one time unit that is used for data transmission and scheduled by the base station, and there is one scheduling window that is in the at least one scheduling window and includes at least two time units.

The monitoring information includes target information of the first target time unit and/or the second target time unit in the scheduling window; and the target information includes position information and/or quantity information, wherein the position information refers to a time position and/or a sequence position.

When the target information only includes the quantity information, the position information can be pre-agreed. For example, if the monitoring information indicates that the PDCCH monitoring is to be performed in two first target time units of the scheduling window, it means that the PDCCH monitoring is to be performed in a first time unit and a last time unit of the scheduling window. For another example, if the monitoring information indicates that the PDCCH monitoring is to be performed in a first target time unit of the scheduling window, it means that the PDCCH monitoring is to be performed in the last time unit of the scheduling window.

The time unit may be a slot, a symbol, or absolute time, and the absolute time may be second, millisecond, or microsecond.

In the embodiments of the present disclosure, the first target time unit is a time unit in which the PDCCH monitoring is to be performed, and the second target unit is a time unit in which the PDCCH monitoring is to be skipped or not performed.

Further, a quantity of first target time units in each scheduling window may be same or different, and a quantity of second target time units in each scheduling window may be same or different.

For example, the base station configures monitoring information in a scheduling window, the scheduling window includes M time units, and the monitoring information is configured to indicate that the PDCCH monitoring is to be performed in N1 time units among M time units and/or that the PDCCH monitoring is to be skipped in in N2 time units among M time units.

M is an integer greater than 2, and both N1 and N2 are integers.

Step 502: performing, according to the monitoring information, a corresponding processing on a time unit in the at least one scheduling window.

Specifically, when the monitoring information indicates that the PDCCH monitoring is to be performed in the first target time unit of the scheduling window, the terminal performs the PDCCH monitoring in the first target time unit of the scheduling window, and when the monitoring information indicates that the PDCCH monitoring is to be skipped in the second target time unit of the scheduling window, the terminal skips the PDCCH monitoring in the second target time unit of the scheduling window; when the monitoring information indicates that the PDCCH monitoring is to be performed in the first target time unit of the scheduling window and the PDCCH monitoring is to be skipped in the second target time unit of the scheduling window, the terminal performs the PDCCH monitoring in the first target time unit of the scheduling window and skips the PDCCH monitoring in the second target time unit of the scheduling window.

The information transmission method of an embodiment of the present disclosure includes: acquiring monitoring information for at least one scheduling window, wherein the monitoring information is configured to indicate that PDCCH monitoring is to be performed in a first target time unit of the scheduling window and/or that the PDCCH monitoring is to be skipped in a second target time unit of the scheduling window; performing, according to the monitoring information, a corresponding processing on a time unit in the at least one scheduling window. In a multi-time unit scheduling process of the embodiments of the present disclosure, for example, in a multi-slot scheduling process, the terminal can accurately determine a position that needs the PDCCH monitoring and a position that does not need the PDCCH monitoring according to the monitoring information, thereby effectively avoiding a problem of increased power consumption of the terminal caused by excessive detection of the PDCCH, or a problem of loss of DCI information caused by missed detection of the PDCCH.

Further, performing according to the monitoring information the corresponding processing on the time unit in the at least one scheduling window includes: performing PDCCH monitoring on the first target time unit of the scheduling window and acquiring a PDCCH for data scheduling, when the monitoring information indicates that the PDCCH monitoring is to be performed in the first target time unit of the scheduling window.

Further, performing the PDCCH monitoring on the first target time unit of the scheduling window and acquiring the PDCCH for the data scheduling when the monitoring information indicates that the PDCCH monitoring is to be performed in the first target time unit of the scheduling window includes: acquiring status information of the monitoring information, wherein the status information includes: activation or deactivation; when the monitoring information indicates that the PDCCH monitoring is to be performed in the first target time unit of the scheduling window, and the status information of the monitoring information is active, performing the PDCCH monitoring on the first target time unit of the scheduling window, and acquiring the PDCCH for the data scheduling.

Acquiring the status information of the monitoring information includes: acquiring the status information of the monitoring information through terminal-specific DCI, group-common DCI, or a power saving signal.

Further, after acquiring the PDCCH for the data scheduling, the information transmission method further includes: receiving a PDSCH or transmitting a PUSCH according to scheduling information in the PDCCH for the data scheduling.

Further, the acquiring the monitoring information of at least one scheduling window includes: acquiring the monitoring information through predetermined information or a predetermined protocol, wherein the predetermined information includes: at least one of terminal-specific DCI, group-common DCI, an MAC control unit, and a power saving signal.

Further, the first target time unit includes a first time unit in a first scheduling window and/or a second time unit in a second scheduling window; and the second target time unit includes a third time unit in the first scheduling window and/or a fourth time unit in the second scheduling window, wherein the first scheduling window is a scheduling window where the monitoring information is located, and the second scheduling window is a scheduling window located after the first scheduling window.

An information transmission method on a terminal side in the embodiments of the present disclosure will be described below in combination with specific embodiments.

Embodiment 7: acquiring the monitoring information through the terminal-specific DCI.

Step 1: acquiring the PDCCH carrying the monitoring information and the scheduling information, wherein the monitoring information is carried through the terminal-specific DCI.

It should be noted that if the terminal has not received the PDCCH for a long time before acquiring the PDCCH that carries the monitoring information and is transmitted by the base station, for example, when a cycle configuration of discontinuous reception (DRX) is large, the DRX enters a DRX-active status from the a DRX-deactive status. Each time the UE enters DRX-on, the UE can monitor the PDCCH according to monitoring position information of a PDCCH configured by default, or monitor the PDCCH according to monitoring position information indicated by the last PDCCH, or monitor the PDCCH according to monitoring position information of a PDCCH configured by Radio Resource Control (RRC), until a new PDCCH has been monitored, and then the PDCCH is monitored according to monitoring position information of a detected PDCCH.

In addition, in this step, the terminal can receive the PDCCH carrying the monitoring information and the PDCCH carrying the scheduling information separately, or receive the PDCCH carrying both the monitoring information and the scheduling information.

Step 2: receiving the PDSCH or transmitting the PUSCH according to the PDCCH for data scheduling.

Embodiment 8: acquiring the monitoring information through the group-common DCI.

Step 1: acquiring the PDCCH carrying the monitoring information and the scheduling information, wherein the monitoring information is carried through the group-common DCI.

It should be noted that if the terminal has not received the PDCCH for a long time before acquiring the PDCCH that carries the monitoring information and is transmitted by the base station, for example, when a cycle configuration of discontinuous reception (DRX) is large, the DRX enters a DRX-active status from the a DRX-deactive status. Each time the UE enters DRX-on, the UE can monitor the PDCCH according to monitoring position information of a PDCCH configured by default, or monitor the PDCCH according to monitoring position information indicated by the last PDCCH, or monitor the PDCCH according to monitoring position information of a PDCCH configured by Radio Resource Control (RRC), until a new PDCCH has been monitored, and then the PDCCH is monitored according to monitoring position information of a detected PDCCH.

In addition, in this step, the terminal can receive the PDCCH carrying the monitoring information and the PDCCH carrying the scheduling information separately, or receive the PDCCH carrying both the monitoring information and the scheduling information.

Step 2: receiving the PDSCH or transmitting the PUSCH according to the PDCCH for data scheduling.

Embodiment 9: acquiring the monitoring information through the power saving signal.

Step 1: acquiring the power saving signal carrying the monitoring information.

Step 2: acquiring the PDCCH for scheduling according to the monitoring information.

Step 3: receiving the PDSCH or transmitting the PUSCH according to the PDCCH for scheduling.

Embodiment 10: acquiring the monitoring information through the predetermined protocol.

Step 1: acquiring the monitoring information according to the predetermined protocol.

The predetermined protocol pre-agrees the monitoring position of the PDCCH and/or skips a position where the PDCCH monitoring. The predetermined protocol may be pre-agreed by the terminal and the base station, or may be configured by a high layer for the terminal, or may be reported to the base station by the terminal. The base station and the terminal use a same principle to determine the PDCCH monitoring position and/or skip the PDCCH monitoring position.

Step 2: acquiring the PDCCH for scheduling according to the monitoring information.

Step 3: receiving the PDSCH or transmitting the PUSCH according to the PDCCH for scheduling.

Embodiment 11: acquiring the monitoring information through the MAC-CE.

Step 1: acquiring the MAC-CE carrying the monitoring information.

The MAC-CE may be based on an indication of the bitmap, for example, with respect to scheduling of M time units, for each time unit, 0 indicates that the PDCCH monitoring may be skipped in this time unit; and 1 indicates that the PDCCH monitoring may be performed in this time unit; the indication of the bitmap may be scrambling the power saving signal by a scrambling code, and the scrambling code may be a defined Radio Network Temporary Identifier (RNTI) sequence agreed by the base station and the UE; the RNTI may be a hexadecimal sequence from 0 to 65535.

The MAC-CE may be carried on the PDSCH, and the base station may transmit the PDSCH through scheduling.

Step 2: acquiring the PDCCH for scheduling according to the monitoring information.

Step 3: receiving the PDSCH or transmitting the PUSCH according to the PDCCH for scheduling.

Embodiment 12: acquiring the monitoring information through the terminal-specific DCI, and acquiring the status information of the monitoring information through the group-common DCI.

Step 1: acquiring the PDCCH carrying the monitoring information and the status information, wherein the PDCCH carries terminal-specific DCI for indicating the monitoring information and the group-common DCI for indicating the status information.

Step 2: acquiring the PDCCH for scheduling according to the monitoring information when the status information is active.

For example, when the status information is configured to be active, and the monitoring information is configured to indicate that the PDCCH monitoring is to be performed in the first target time unit in the scheduling window, the PDCCH for scheduling is received.

Step 3: transmitting the PDSCH or receive the PUSCH according to the PDCCH for scheduling.

It should be noted that, in the embodiments of the present disclosure, the status information of the monitoring information can also be acquired through the terminal-specific DCI, and the monitoring information can be acquired through the group-common DCI. A specific implementation process is same as that of the embodiment 12, and will not be repeatedly described in detail herein.

The information transmission method of an embodiment of the present disclosure includes: acquiring monitoring information for at least one scheduling window, wherein the monitoring information is configured to indicate that PDCCH monitoring is to be performed in a first target time unit of the scheduling window and/or that the PDCCH monitoring is to be skipped in a second target time unit of the scheduling window; performing, according to the monitoring information, a corresponding processing on a time unit in the at least one scheduling window. In a multi-time unit scheduling process of the embodiments of the present disclosure, for example, in a multi-slot scheduling process, the terminal can accurately determine a position that needs the PDCCH monitoring and a position that does not need the PDCCH monitoring according to the monitoring information, thereby effectively avoiding a problem of increased power consumption of the terminal caused by excessive detection of the PDCCH, or a problem of loss of DCI information caused by missed detection of the PDCCH.

Figure 6:
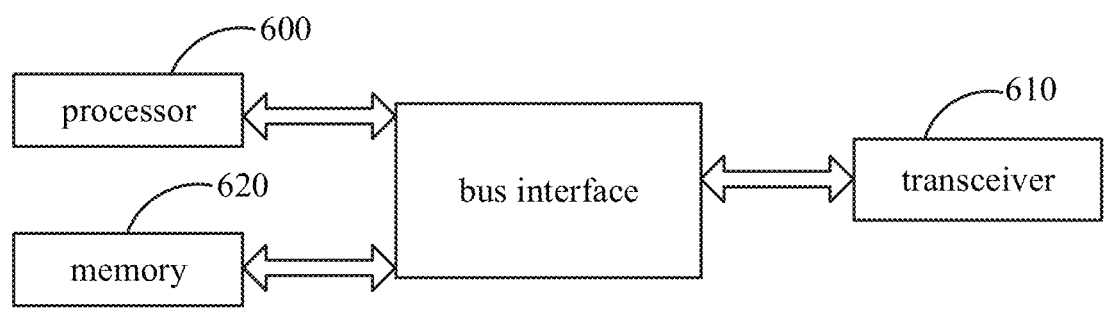
FIG. 6 is a structural block diagram of a base station in an embodiment of the disclosure.

As shown in FIG. 6, the embodiments of the present disclosure further provides a base station, including a memory 620, a processor 600, a transceiver 610, a bus interface, and a computer program stored in the memory 620 and executable by the processor 600. The processor 600 is configured to read the program in the memory 620 to implement following processes: configuring monitoring information for at least one scheduling window, wherein the monitoring information is configured to indicate that PDCCH monitoring is to be performed in a first target time unit of the scheduling window and/or that the PDCCH monitoring is to be skipped in a second target time unit of the scheduling window; notifying a terminal of the monitoring information, wherein each of the at least one scheduling window includes at least one time unit that is used for data transmission and scheduled by the base station, and there is one scheduling window that is in the at least one scheduling window and includes at least two time units.

In FIG. 6, a bus architecture may include a quantity of buses and bridges connected to each other, so as to connect various circuits for one or more processors such as the processor 600 and one or more memories such as the processor 620. In addition, the bus architecture may be used to connect various other circuits, such as a circuit for a peripheral device, a circuit for a voltage stabilizer and a power management circuit, which are known in the art and will not be further described herein. The bus interface may be provided, and the transceiver 610 may consist of a plurality of elements, i.e., a transmitter and a transceiver for communication with various other devices over a transmission medium. The processor 600 is responsible for managing the bus architecture and general processing, and the memory 620 can store data used by the processor 600 when performing operations.

Optionally, the monitoring information includes target information of the first target time unit and/or the second target time unit in the scheduling window; and the target information includes position information and/or quantity information, wherein the position information refers to a time position and/or a sequence position.

Optionally, the processor 600 is further configured to read the program in the memory 620, to implement a following step: notifying the terminal of the monitoring information through predetermined information or a predetermined protocol, wherein the predetermined information includes at least one of terminal-specific DCI, group-common DCI, an MAC control unit, and a power saving signal.

Optionally, the processor 600 is further configured to read the program in the memory 620, to implement a following step: notifying the terminal of the monitoring information through a bitmap of the predetermined information, wherein each bit in the bitmap of the predetermined information is configured to indicate that a time unit corresponding to the bit is the first target time unit or the second target time unit.

Optionally, the first target time unit includes a first time unit in a first scheduling window and/or a second time unit in a second scheduling window; and the second target time unit includes a third time unit in the first scheduling window and/or a fourth time unit in the second scheduling window, wherein the first scheduling window is a scheduling window where the monitoring information is located, and the second scheduling window is a scheduling window located after the first scheduling window.

Optionally, the processor 600 is further configured to read the program in the memory 620, to implement a following step: notifying the terminal of status information corresponding to the monitoring information, wherein the status information includes activation or deactivation.

Optionally, the processor 600 is further configured to read the program in the memory 620, to implement a following step: notifying the terminal of the status information corresponding to the monitoring information through terminal-specific DCI, group-common DCI, or a power saving signal.

Optionally, the processor 600 is further configured to read the program in the memory 620, to implement a following step: transmitting, when the monitoring information indicates that the PDCCH monitoring is to be performed in the first target time unit of the scheduling window, a PDCCH for data scheduling in the first target time unit of the scheduling window.

Optionally, the processor 600 is further configured to read the program in the memory 620, to implement a following step: transmitting a PDSCH or receiving a PUSCH according to scheduling information in the PDCCH for the data scheduling.

The information transmission method of an embodiment of the present disclosure includes: configuring monitoring information for at least one scheduling window, wherein the monitoring information is configured to indicate that PDCCH monitoring is to be performed in a first target time unit of the scheduling window and/or that the PDCCH monitoring is to be skipped in a second target time unit of the scheduling window; notifying a terminal of the monitoring information. In a multi-time unit scheduling process of the embodiments of the present disclosure, for example, in a multi-slot scheduling process, the terminal can accurately determine a position that needs the PDCCH monitoring and a position that does not need the PDCCH monitoring according to the monitoring information, thereby effectively avoiding a problem of increased power consumption of the terminal caused by excessive detection of the PDCCH, or a problem of loss of DCI information caused by missed detection of the PDCCH.

In some embodiments of the present disclosure, a computer-readable storage medium is further provided, on which a computer program is stored, and when the program is executed by a processor, following steps are implemented: configuring monitoring information for at least one scheduling window, wherein the monitoring information is configured to indicate that PDCCH monitoring is to be performed in a first target time unit of the scheduling window and/or that the PDCCH monitoring is to be skipped in a second target time unit of the scheduling window; notifying a terminal of the monitoring information, wherein each of the at least one scheduling window includes at least one time unit that is used for data transmission and scheduled by the base station, and there is one scheduling window that is in the at least one scheduling window and includes at least two time units.

When the program is executed by the processor, all implementation in the method embodiments operable by the base station side can be realized. In order to avoid repetition, it will not be repeatedly described herein.

Figure 7:
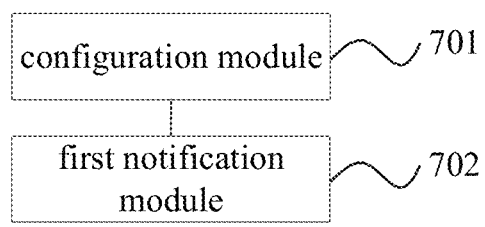
FIG. 7 is a schematic diagram of modules of a base station in an embodiment of the disclosure.

As shown in FIG. 7, an embodiment of the present disclosure further provides a base station, including: a configuration module 701, configured to configure monitoring information for at least one scheduling window, wherein the monitoring information is configured to indicate that PDCCH monitoring is to be performed in a first target time unit of the scheduling window and/or that the PDCCH monitoring is to be skipped in a second target time unit of the scheduling window; a first notification module 702, configured to notify a terminal of the monitoring information, wherein each of the at least one scheduling window includes at least one time unit that is used for data transmission and scheduled by the base station, and there is one scheduling window that is in the at least one scheduling window and includes at least two time units.

In the base station of the embodiments of the present disclosure, the monitoring information includes target information of the first target time unit and/or the second target time unit in the scheduling window; and the target information includes position information and/or quantity information, wherein the position information refers to a time position and/or a sequence position.

In the base station of the embodiments of the present disclosure, the first notification module is configured to notify the terminal of the monitoring information through predetermined information or a predetermined protocol, wherein the predetermined information includes at least one of terminal-specific DCI, group-common DCI, an MAC control unit, and a power saving signal.

In the base station of the embodiments of the present disclosure, the first notification module is configured to notify the terminal of the monitoring information through a bitmap of the predetermined information, wherein each bit in the bitmap of the predetermined information is configured to indicate that a time unit corresponding to the bit is the first target time unit or the second target time unit.

In the base station of the embodiments of the present disclosure, the first target time unit includes a first time unit in a first scheduling window and/or a second time unit in a second scheduling window; and the second target time unit includes a third time unit in the first scheduling window and/or a fourth time unit in the second scheduling window, wherein the first scheduling window is a scheduling window where the monitoring information is located, and the second scheduling window is a scheduling window located after the first scheduling window.

The base station of the embodiments of the present disclosure further includes: a second notification module configured to notify the terminal of status information corresponding to the monitoring information, wherein the status information includes activation or deactivation.

In the base station of the embodiments of the present disclosure, the second notification module is configured to notify the terminal of the status information corresponding to the monitoring information through terminal-specific DCI, group-common DCI, or a power saving signal.

The base station of the embodiments of the present disclosure further includes: a first transmission module configured to transmit, when the monitoring information indicates that the PDCCH monitoring is to be performed in the first target time unit of the scheduling window, a PDCCH for data scheduling in the first target time unit of the scheduling window.

The base station of the embodiments of the present disclosure further includes: a second transmission module configured to transmit a PDSCH or receiving a PUSCH according to scheduling information in the PDCCH for the data scheduling.

According to the base station of the embodiments of the present disclosure: monitoring information for at least one scheduling window is configured, wherein the monitoring information is configured to indicate that PDCCH monitoring is to be performed in a first target time unit of the scheduling window and/or that the PDCCH monitoring is to be skipped in a second target time unit of the scheduling window; the monitoring information is notified to a terminal. In a multi-time unit scheduling process of the embodiments of the present disclosure, for example, in a multi-slot scheduling process, the terminal can accurately determine a position that needs the PDCCH monitoring and a position that does not need the PDCCH monitoring according to the monitoring information, thereby effectively avoiding a problem of increased power consumption of the terminal caused by excessive detection of the PDCCH, or a problem of loss of DCI information caused by missed detection of the PDCCH.

Figure 8:
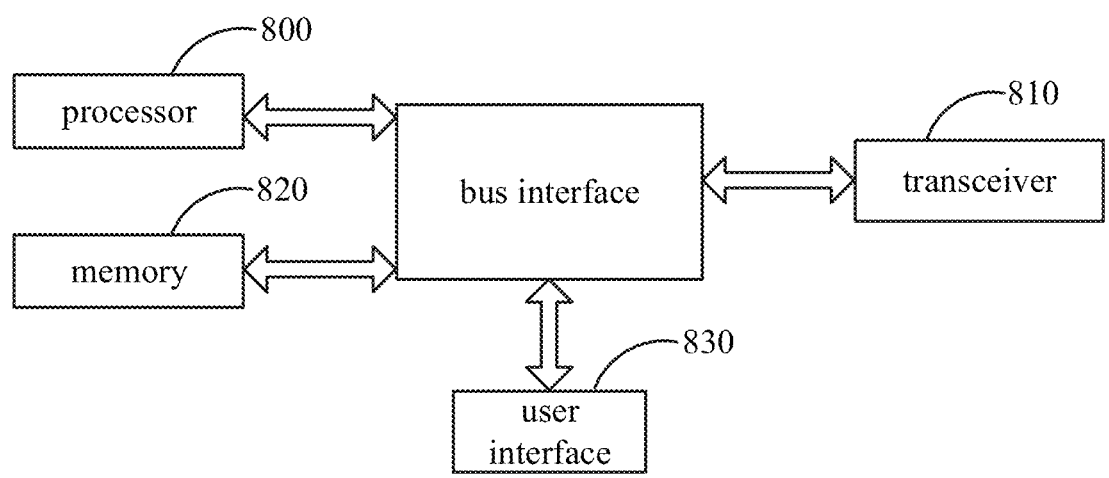
FIG. 8 is a structural block diagram of a terminal in an embodiment of the disclosure.

As shown in FIG. 8, the embodiments of the present disclosure further provide a terminal, including: a transceiver, a memory, a processor, and a program stored on the memory and executable by the processor, wherein when the processor executes the program, following steps are implemented: acquiring monitoring information for at least one scheduling window, wherein the monitoring information is configured to indicate that PDCCH monitoring is to be performed in a first target time unit of the scheduling window and/or that the PDCCH monitoring is to be skipped in a second target time unit of the scheduling window; performing, according to the monitoring information, a corresponding processing on a time unit in the at least one scheduling window, wherein each of the at least one scheduling window includes at least one time unit that is used for data transmission and scheduled by the base station, and there is one scheduling window that is in the at least one scheduling window and includes at least two time units.

In FIG. 8, a bus architecture may include a quantity of buses and bridges connected to each other, so as to connect various circuits for one or more processors such as the processor 800 and one or more memories such as the processor 820. In addition, the bus architecture may be used to connect various other circuits, such as a circuit for a peripheral device, a circuit for a voltage stabilizer and a power management circuit, which are known in the art and will not be further described herein. The bus interface may be provided, and the transceiver 810 may consist of a plurality of elements, i.e., a transmitter and a transceiver for communication with various other devices over a transmission medium. With respect to different UEs, the user interface 830 may also be provided for devices which are to be arranged inside or outside the UE, and these devices may include but not limited to a keypad, a display, a speaker, a microphone and a joystick.

The processor 800 may take charge of managing the bus architecture as well general processing. The processor 820 may store data therein for the operation of the processor 800.

Optionally, the processor 800 is further configured to read a program in the memory 820, to implement following steps: performing PDCCH monitoring on the first target time unit of the scheduling window and acquiring a PDCCH for data scheduling, when the monitoring information indicates that the PDCCH monitoring is to be performed in the first target time unit of the scheduling window.

Optionally, the processor 800 is further configured to read the program in the memory 820, to implement following steps: acquiring status information of the monitoring information, wherein the status information includes: activation or deactivation; when the monitoring information indicates that the PDCCH monitoring is to be performed in the first target time unit of the scheduling window, and the status information of the monitoring information is active, performing the PDCCH monitoring on the first target time unit of the scheduling window, and acquiring the PDCCH for the data scheduling.

Optionally, the processor 800 is further configured to read the program in the memory 820, to implement a following step: acquiring the status information of the monitoring information through terminal-specific DCI, group-common DCI, or a power saving signal.

Optionally, the processor 800 is further configured to read the program in the memory 820, to implement a following step: receiving a PDSCH or transmitting a PUSCH according to scheduling information in the PDCCH for the data scheduling.

Optionally, the monitoring information includes target information of the first target time unit and/or the second target time unit in the scheduling window; and the target information includes position information and/or quantity information, wherein the position information refers to a time position and/or a sequence position.

Optionally, the processor 800 is further configured to read the program in the memory 820, to implement a following step: acquiring the monitoring information through predetermined information or a predetermined protocol, wherein the predetermined information includes: at least one of terminal-specific DCI, group-common DCI, an MAC control unit, and a power saving signal.

Optionally, the first target time unit includes a first time unit in a first scheduling window and/or a second time unit in a second scheduling window; and the second target time unit includes a third time unit in the first scheduling window and/or a fourth time unit in the second scheduling window, wherein the first scheduling window is a scheduling window where the monitoring information is located, and the second scheduling window is a scheduling window located after the first scheduling window.

According to the terminal of the embodiments of the present disclosure, monitoring information for at least one scheduling window is acquired, wherein the monitoring information is configured to indicate that PDCCH monitoring is to be performed in a first target time unit of the scheduling window and/or that the PDCCH monitoring is to be skipped in a second target time unit of the scheduling window; a corresponding processing is performed on a time unit in the at least one scheduling window according to the monitoring information. In a multi-time unit scheduling process of the embodiments of the present disclosure, for example, in a multi-slot scheduling process, the terminal can accurately determine a position that needs the PDCCH monitoring and a position that does not need the PDCCH monitoring according to the monitoring information, thereby effectively avoiding a problem of increased power consumption of the terminal caused by excessive detection of the PDCCH, or a problem of loss of DCI information caused by missed detection of the PDCCH.

In some embodiments of the present disclosure, a computer-readable storage medium is further provided, on which a computer program is stored, and when the program is executed by a processor, following steps are implemented: acquiring monitoring information for at least one scheduling window, wherein the monitoring information is configured to indicate that PDCCH monitoring is to be performed in a first target time unit of the scheduling window and/or that the PDCCH monitoring is to be skipped in a second target time unit of the scheduling window; performing, according to the monitoring information, a corresponding processing on a time unit in the at least one scheduling window, wherein each of the at least one scheduling window includes at least one time unit that is used for data transmission and scheduled by the base station, and there is one scheduling window that is in the at least one scheduling window and includes at least two time units.

When the program is executed by the processor, all implementation in the embodiments of the information transmission method applied to the terminal side can be realized. In order to avoid repetition, it will not be repeatedly described herein.

Figure 9:
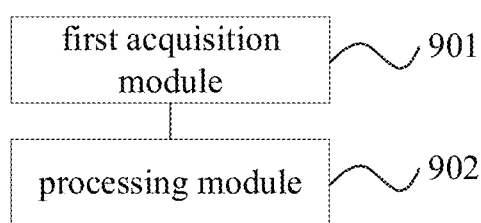
FIG. 9 is a schematic diagram of modules of a terminal in an embodiment of the disclosure.

As shown in FIG. 9, an embodiment of the present disclosure further provides a terminal, including: a first acquisition module 901, configured to acquire monitoring information for at least one scheduling window, wherein the monitoring information is configured to indicate that PDCCH monitoring is to be performed in a first target time unit of the scheduling window and/or that the PDCCH monitoring is to be skipped in a second target time unit of the scheduling window; a processing module 902, configured to perform, according to the monitoring information, a corresponding processing on a time unit in the at least one scheduling window, wherein each of the at least one scheduling window includes at least one time unit that is used for data transmission and scheduled by the base station, and there is one scheduling window that is in the at least one scheduling window and includes at least two time units.

In the terminal of the embodiments of the present disclosure, the processing module is configured to perform PDCCH monitoring on the first target time unit of the scheduling window and acquiring a PDCCH for data scheduling, when the monitoring information indicates that the PDCCH monitoring is to be performed in the first target time unit of the scheduling window.

In the terminal of the embodiments of the present disclosure, the processing module includes: a first acquisition submodule configured to acquire status information of the monitoring information, wherein the status information includes: activation or deactivation; a second acquisition submodule configured to perform the PDCCH monitoring on the first target time unit of the scheduling window, and acquire the PDCCH for the data scheduling when the monitoring information indicates that the PDCCH monitoring is to be performed in the first target time unit of the scheduling window, and the status information of the monitoring information is active.

In the terminal of the embodiments of the present disclosure, the first acquisition submodule is configured to acquire the status information of the monitoring information through terminal-specific DCI, group-common DCI, or a power saving signal.

The terminal of the embodiments of the present disclosure further includes: a third transmission module configured to receive a PDSCH or transmitting a PUSCH according to scheduling information in the PDCCH for the data scheduling.

In the terminal of the embodiments of the present disclosure, the monitoring information includes target information of the first target time unit and/or the second target time unit in the scheduling window; and the target information includes position information and/or quantity information, wherein the position information refers to a time position and/or a sequence position.

In the terminal of the embodiments of the present disclosure, the first obtaining module is configured to acquire the monitoring information through predetermined information or a predetermined protocol, wherein the predetermined information includes: at least one of terminal-specific DCI, group-common DCI, an MAC control unit, and a power saving signal.

In the terminal of the embodiments of the present disclosure, the first target time unit includes a first time unit in a first scheduling window and/or a second time unit in a second scheduling window; and the second target time unit includes a third time unit in the first scheduling window and/or a fourth time unit in the second scheduling window, wherein the first scheduling window is a scheduling window where the monitoring information is located, and the second scheduling window is a scheduling window located after the first scheduling window.

According to the terminal of the embodiments of the present disclosure, monitoring information for at least one scheduling window is acquired, wherein the monitoring information is configured to indicate that PDCCH monitoring is to be performed in a first target time unit of the scheduling window and/or that the PDCCH monitoring is to be skipped in a second target time unit of the scheduling window; a corresponding processing is performed on a time unit in the at least one scheduling window according to the monitoring information. In a multi-time unit scheduling process of the embodiments of the present disclosure, for example, in a multi-slot scheduling process, the terminal can accurately determine a position that needs the PDCCH monitoring and a position that does not need the PDCCH monitoring according to the monitoring information, thereby effectively avoiding a problem of increased power consumption of the terminal caused by excessive detection of the PDCCH, or a problem of loss of DCI information caused by missed detection of the PDCCH.

In the various embodiments of the present disclosure, it should be understood that sequence numbers of the above processes do not mean sequence of execution, and the execution sequence of each process should be determined by its function and internal logic, and should not constitute any limitation to implementation processes of the embodiments of the present disclosure.

A person skilled in the art may realize that the units and algorithm steps of each example described in combination with the embodiments disclosed herein may be implemented in electronic hardware, or a combination of computer software and electronic hardware. Whether these functions are performed in hardware or software depends on a specific application and design constraints of the technical solution. A person skilled in the art may implement the described functions in varying ways for each specific application, but such implementation should not be considered beyond the scope of the present disclosure.

A person skilled in the art may clearly understand that, for the convenience and brevity of description, the specific working processes of the systems, devices, and units described above may refer to the corresponding processes in the above method embodiments, which will not be repeatedly described herein.

In the embodiments provided by the present application, it should be appreciated that the disclosed device and method may be implemented in other manners. For example, the device embodiments described above are merely illustrative. For example, division of the units is merely a logical function division. In actual implementation, there may be another division manner. For example, multiple units or components may be combined, or may be integrated into another system, or some features may be ignored or not executed. In addition, coupling or direct coupling or communication connection between the components shown or discussed may be indirect coupling or communication connection through some interfaces, devices or units, and may be in electrical, mechanical or another form.

The units described as separate components may or may not be physically separated, and the components displayed as the units may or may not be physical units, that is, they may be located in one place or distributed to multiple network units. Some or all of the units may be selected according to actual needs to achieve objectives of the present disclosure.

In addition, different functional units in the different embodiments of the present disclosure may be integrated into one processing unit, or may physically exist separately, or two or more units may be integrated into one unit.

When the functions are implemented in a form of software functional units and sold or used as independent products, they may be stored in a computer-readable storage medium. Based on this understanding, the technical solution of the present disclosure essentially, or a part that contributes to the related art, or a part of the technical solution may be embodied in a form of a software product. The computer software product is stored in a storage medium and includes instructions for causing a computer device (for example, a personal computer, a server, or a network device) to perform all or part of the steps of the method described in various embodiments of the present disclosure. The above storage medium includes various media that can store program codes, such as a Universal Serial Bus (USB) flash disk, a mobile hard disk, a Read-Only Memory (ROM), a Random Access Memory (RAM), a magnetic disk, an optical disk, or the like.

A person of ordinary skill in the art can understand that all or part of the processes in the above embodiment methods can be implemented by controlling a relevant hardware through a computer program. The program can be stored in a computer readable storage medium, and when the program is executed, it may include the processes of the embodiments of the above methods. The storage medium may be a magnetic disk, an optical disc, a ROM, or a RAM, etc.

It should be appreciated that the embodiments described in the embodiments of the present disclosure may be implemented by hardware, software, firmware, middleware, microcode, or a combination thereof. For hardware implementation, the processing unit can be implemented in one or more Application Specific Integrated Circuits (ASICs), Digital Signal Processors (DSPs), Digital Signal Processing Devices (DSPDs), Programmable Logic Devices (PLDs), Field-Programmable Gate Arrays (FPGAs), general-purpose processors, controllers, microcontrollers, microprocessors, and other electronic units for performing functions described in this disclosure or a combination thereof.

For software implementation, techniques described in the embodiments of the present disclosure may be implemented by modules (such as procedures, functions) that perform the functions described in the embodiments of the present disclosure. Software codes may be stored in a memory and executed by a processor. The memory can be implemented in the processor or external to the processor.

The above are optional embodiments of the present disclosure, and it should be noted that a person skilled in the art can make various improvements and modifications without departing from principles of the present disclosure, and these improvements and modifications should also be regarded as falling within the protection scope of the present disclosure.

What is claimed is:

1. An information transmission method operable by a base station, comprising:
    configuring monitoring information for one scheduling window, wherein the monitoring information is configured to indicate at least one of that Physical Downlink Control Channel (PDCCH) monitoring is to be performed by a terminal in a first target time unit of the scheduling window or that the PDCCH monitoring is to be skipped by the terminal in a second target time unit of the scheduling window;
    notifying the terminal of the monitoring information,
    wherein the scheduling window comprises at least one time unit that is used for data transmission and scheduled by the base station, the first target time unit comprises a first time unit in the scheduling window, the second target time unit comprises a third time unit in the scheduling window, and each of the first target time unit, the second target time unit, the at least one time unit, the first time unit, and the third time unit is a slot, a symbol, or absolute time, and the absolute time is second, millisecond, or microsecond;
    wherein the notifying the terminal of the monitoring information comprises:
    notifying the terminal of the monitoring information through a bitmap of predetermined information,
    wherein each bit in the bitmap of the predetermined information is configured to indicate that a time unit corresponding to the bit is the first target time unit or the second target time unit;
    wherein the predetermined information comprises one or more of group-common Downlink Control Information (DCI), a Medium Access Control (MAC) control unit, and a power saving signal.

2. The information transmission method according to claim 1, wherein the monitoring information comprises at least one of target information of the first target time unit or the second target time unit in the scheduling window; and
the target information comprises at least one of position information or quantity information, wherein the position information comprises at least one of a time position or a sequence position.

3. The information transmission method according to claim 1, wherein notifying the terminal of the monitoring information further comprises:
    notifying the terminal of the monitoring information through a predetermined protocol, or
    wherein the predetermined information further comprises terminal-specific DC.

4. The information transmission method according to claim 1, wherein after configuring the monitoring information for the scheduling window, the information transmission method comprises:
    notifying the terminal of status information corresponding to the monitoring information, wherein the status information comprises activation or deactivation.

5. The information transmission method according to claim 4, wherein notifying the terminal of the status information corresponding to the monitoring information comprises:
    notifying the terminal of the status information corresponding to the monitoring information through terminal-specific DCI, group-common DCI, or a power saving signal.

6. The information transmission method according to claim 1, wherein after configuring the monitoring information for the scheduling window, the information transmission method comprises:
    transmitting, when the monitoring information indicates that the PDCCH monitoring is to be performed by the terminal in the first target time unit of the scheduling window, a PDCCH for data scheduling in the first target time unit of the scheduling window.

7. The information transmission method according to claim 6, wherein after transmitting the PDCCH for the data scheduling, the information transmission method comprises:
    transmitting a Physical Downlink Shared Channel (PDSCH) or receiving a Physical Uplink Shared Channel (PUSCH) according to scheduling information in the PDCCH for the data scheduling.

8. An information transmission method operable by a terminal, comprising:
    acquiring, from a base station, monitoring information for one scheduling window, wherein the monitoring information is configured to indicate at least one of that PDCCH monitoring is to be performed by the terminal in a first target time unit of the scheduling window or that the PDCCH monitoring is to be skipped by the terminal in a second target time unit of the scheduling window;
    performing, according to the monitoring information, a corresponding processing on a time unit in the scheduling window,
    wherein the scheduling window comprises at least one time unit that is used for data transmission and scheduled by the base station, the first target time unit comprises a first time unit in the scheduling window, the second target time unit comprises a third time unit in the scheduling window, and each of the first target time unit, the second target time unit, the at least one time unit, the first time unit, and the third time unit is a slot, a symbol, or absolute time, and the absolute time is second, millisecond, or microsecond;

wherein the acquiring the monitoring information for one scheduling window comprises acquiring the monitoring information through a bitmap of predetermined information, wherein each bit in the bitmap of the predetermined information is configured to indicate that a time unit corresponding to the bit is the first target time unit or the second target time unit;

wherein the predetermined information comprises one or more of group-common Downlink Control Information (DCI), a Medium Access Control (MAC) control unit, and a power saving signal.

9. The information transmission method according to claim 8, wherein performing according to the monitoring information the corresponding processing on the time unit in the scheduling window comprises:

performing PDCCH monitoring on the first target time unit of the scheduling window and acquiring a PDCCH for data scheduling, when the monitoring information indicates that the PDCCH monitoring is to be performed by the terminal in the first target time unit of the scheduling window.

10. The information transmission method according to claim 9, wherein performing the PDCCH monitoring on the first target time unit of the scheduling window and acquiring the PDCCH for the data scheduling when the monitoring information indicates that the PDCCH monitoring is to be performed by the terminal in the first target time unit of the scheduling window comprises:

acquiring status information of the monitoring information, wherein the status information comprises: activation or deactivation;

when the monitoring information indicates that the PDCCH monitoring is to be performed by the terminal in the first target time unit of the scheduling window, and the status information of the monitoring information is active, performing the PDCCH monitoring on the first target time unit of the scheduling window, and acquiring the PDCCH for the data scheduling.

11. The information transmission method according to claim 10, wherein acquiring the status information of the monitoring information comprises:

acquiring the status information of the monitoring information through terminal-specific DCI, group-common DCI, or a power saving signal.

12. The information transmission method according to claim 9, wherein after the acquiring the PDCCH for the data scheduling, the information transmission method comprises:

receiving a PDSCH or transmitting a PUSCH according to scheduling information in the PDCCH for the data scheduling.

13. The information transmission method according to claim 8, wherein the monitoring information comprises at least one of target information of the first target time unit or the second target time unit in the scheduling window; and the target information comprises at least one of position information or quantity information, wherein the position information comprises at least one of a time position or a sequence position.

14. The information transmission method according to claim 8, wherein the acquiring the monitoring information for one scheduling window further comprises:

acquiring the monitoring information through a predetermined protocol, or wherein the predetermined information further comprises: terminal-specific DCI.

15. A terminal comprises: a transceiver, a memory, a processor, and a program stored on the memory and executable by the processor, wherein when the processor executes the program, the information transmission method according to claim 8 are implemented.

16. A base station comprises: a transceiver, a memory, a processor, and a program stored on the memory and executable by the processor, wherein when the processor executes the program, following steps are implemented:

configuring monitoring information for one scheduling window, wherein the monitoring information is configured to indicate at least one of that PDCCH monitoring is to be performed by a terminal in a first target time unit of the scheduling window or that the PDCCH monitoring is to be skipped by the terminal in a second target time unit of the scheduling window;

notifying the terminal of the monitoring information, wherein the scheduling window comprises at least one time unit that is used for data transmission and scheduled by the base station, the first target time unit comprises a first time unit in the scheduling window, the second target time unit comprises a third time unit in the scheduling window, and each of the first target time unit, the second target time unit, the at least one time unit, the first time unit, and the third time unit is a slot, a symbol, or absolute time, and the absolute time is second, millisecond, or microsecond;

wherein the notifying the terminal of the monitoring information comprises:

notifying the terminal of the monitoring information through a bitmap of predetermined information, wherein each bit in the bitmap of the predetermined information is configured to indicate that a time unit corresponding to the bit is the first target time unit or the second target time unit;

wherein the predetermined information comprises one or more of group-common Downlink Control Information (DCI), a Medium Access Control (MAC) control unit, and a power saving signal.

17. The base station according to claim 16, wherein the monitoring information comprises at least one of target information of the first target time unit or the second target time unit in the scheduling window; and the target information comprises at least one of position information or quantity information, wherein the position information comprises at least one of a time position or a sequence position.

* * * * *